No. 865,286. PATENTED SEPT. 3, 1907.
W. E. ZAHNER.
METALLIC WINDOW.
APPLICATION FILED JULY 31, 1906.

6 SHEETS—SHEET 1.

Witnesses:
R. E. Hamilton
E. B. House

William E. Zahner Inventor
By His Attorney
Warren D. House

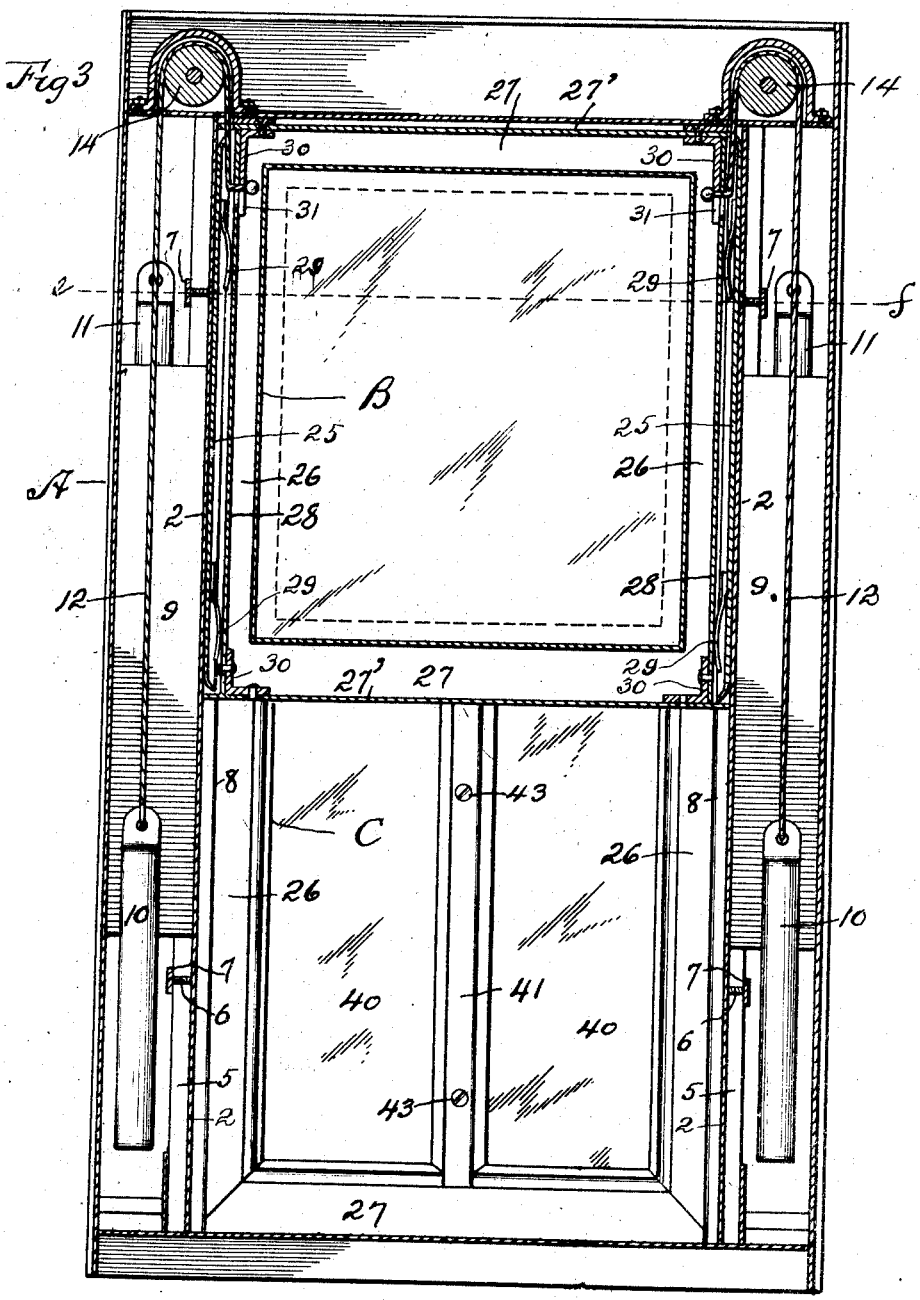

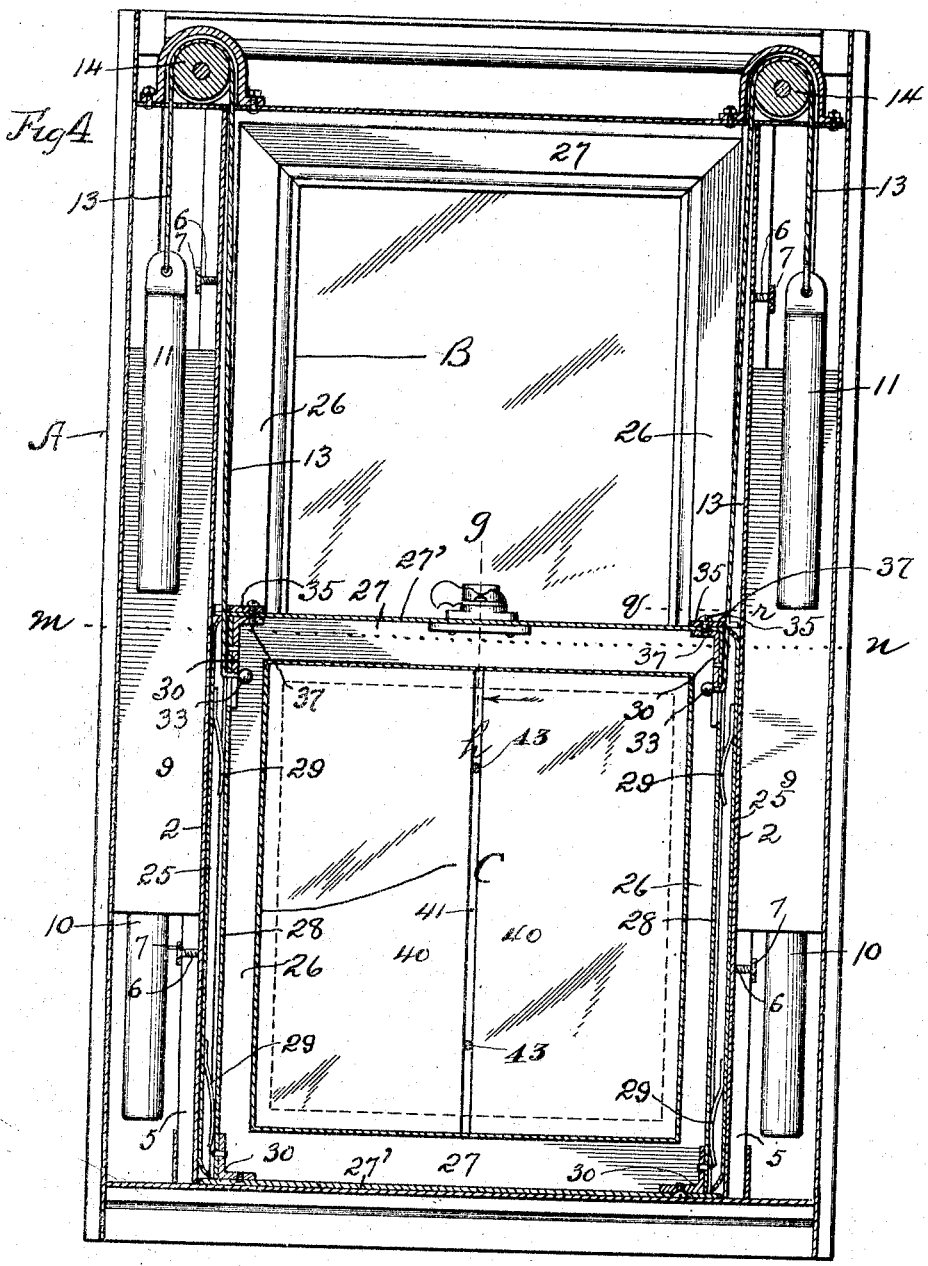

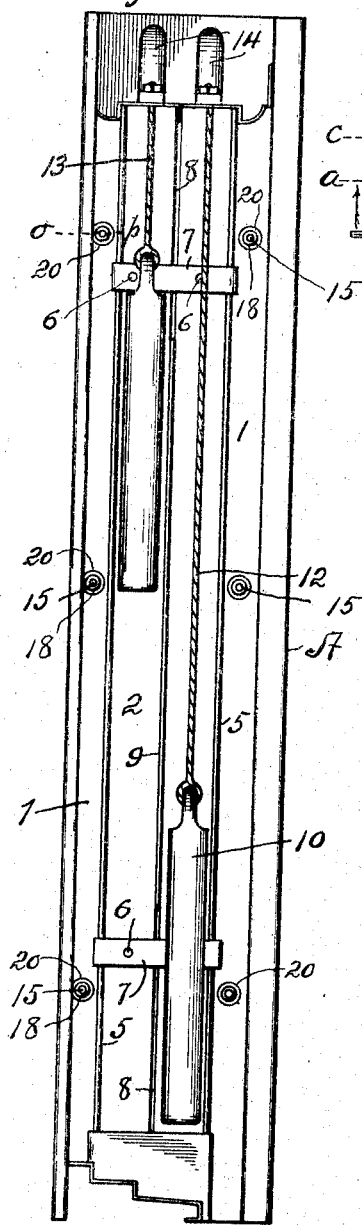
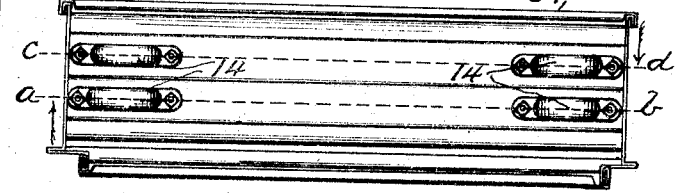
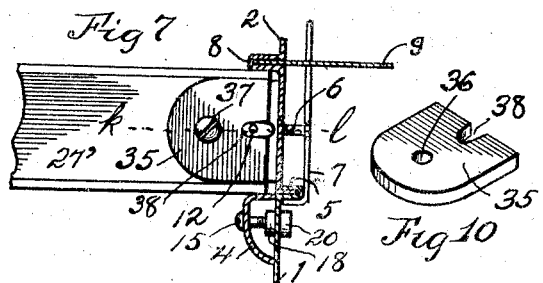
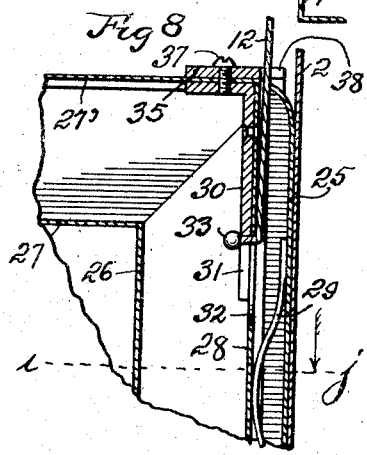
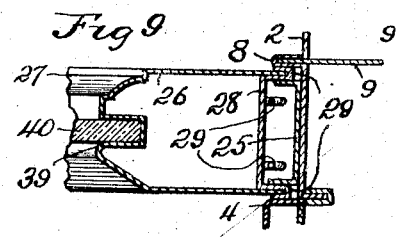

No. 865,286. PATENTED SEPT. 3, 1907.
W. E. ZAHNER.
METALLIC WINDOW.
APPLICATION FILED JULY 31, 1906.
5 SHEETS—SHEET 5.
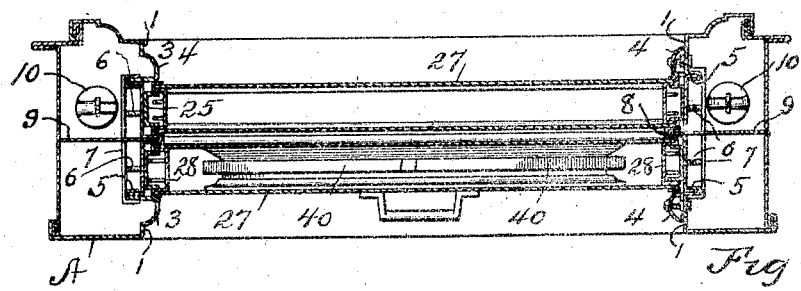
Fig 13
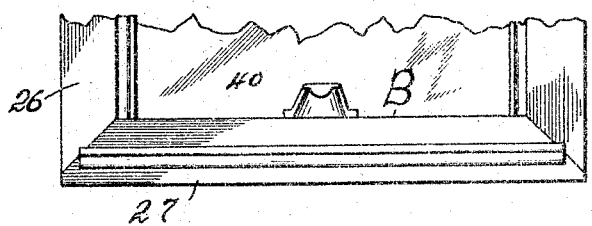
Fig 14
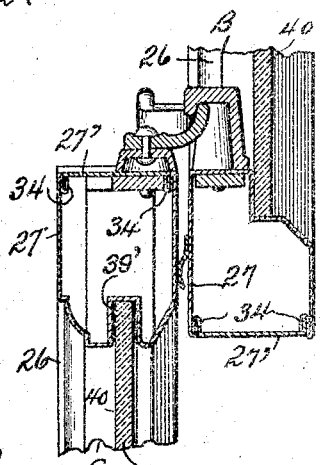
Fig 15
Fig 17
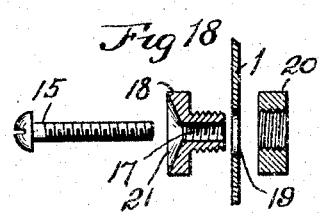
Fig 18
Fig 19
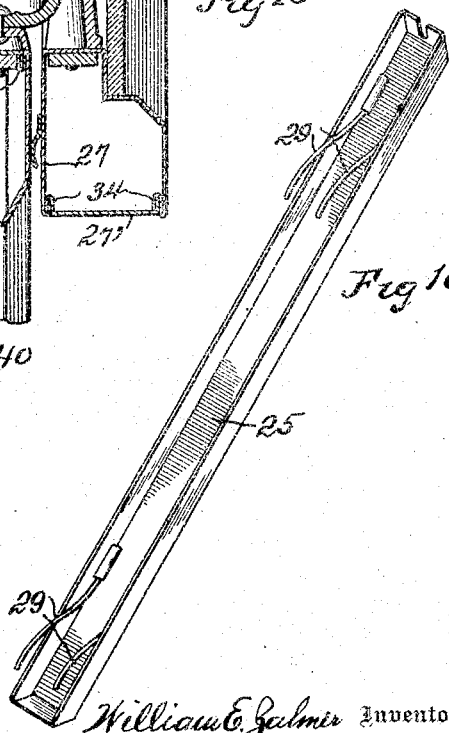
Fig 16
Witnesses:
R. E. Hamilton
E. B. House
William E. Zahner, Inventor
By His Attorney Warren D. House

UNITED STATES PATENT OFFICE.

WILLIAM E. ZAHNER, OF KANSAS CITY, MISSOURI.

METALLIC WINDOW.

No. 865,286.  Specification of Letters Patent.  Patented Sept. 3, 1907.

Application filed July 31, 1906. Serial No. 328,593.

*To all whom it may concern:*

Be it known that I, WILLIAM E. ZAHNER, a citizen of the United States, residing at Kansas City, in the county of Jackson and State of Missouri, have invented certain new and useful Improvements in Metallic Windows, of which the following is a specification.

My invention relates to improvements in metallic windows.

The object of my invention is to provide a window the frame and sash of which are made of sheet metal, with means by which the sashes are readily slidably fitted to the frame and which do not require precise dimensions in their construction. Broadly stated this object is achieved by providing the sash at one or both side edges with vertical grooves in which are mounted, one in each groove, a horizontally movable filler, means being provided by which the filler is normally forced against the adjacent side of the frame.

My invention provides means further by which the filler may be inserted or removed through the end of the vertical groove, thus obviating the removal of any of the stops for this purpose.

My invention provides further removable bearing plates adapted to be secured to the sides of the frame and which serve as bearings for the sashes to slide against. When owing to wear it is necessary to replace the bearing plates it may be done without having to remove or replace the entire frame.

My invention provides further novel means for releasably securing the bearing or pocket plates in position on the frame.

My invention provides further a laterally adjustable vertical stop and novel means for securing the stop to the frame.

Other novel features are hereinafter fully described and claimed.

Figure 1:
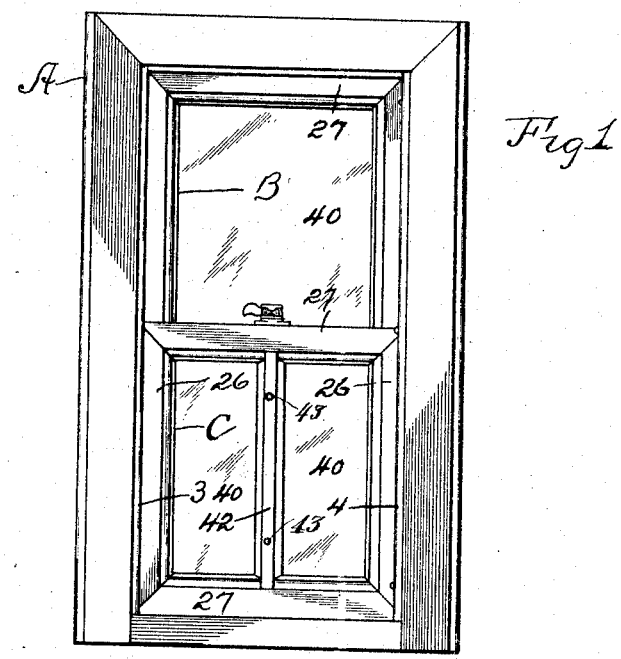
Figure 2:
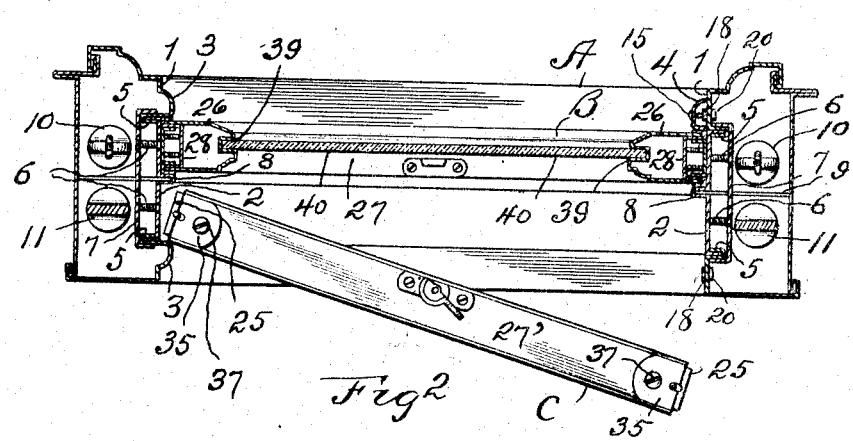

In the accompanying drawings which illustrate my invention:—Figure 1 is a front elevation of the window showing both sashes in their closed position. Fig. 2 is a horizontal sectional view taken on the dotted line $e$—$f$ of Fig. 3 and showing one outer stop removed and the lower sash swung outwardly partly clear of the frame. Fig. 3 is a vertical sectional view taken on the dotted line $c$—$d$ of Fig. 5. Fig. 4 is a vertical sectional view taken on the dotted line $a$—$b$ of Fig. 5. Fig. 5 is a top view of the window frame. Fig. 6 is a side elevation of the window frame. Fig. 7 is a horizontal sectional view taken on the dotted line $q$—$r$ of Fig. 4. Fig. 8 is a vertical sectional view taken on the dotted line $k$—$l$ of Fig. 7. Fig. 9 is a cross section taken on the dotted line $i$—$j$ of Fig. 8. Fig. 10 is a perspective view of one of the plates employed to close the grooves in the sides of the sashes. Fig. 11 is an outside elevation view of the upper end of a side edge of one of the sashes, the filler being removed. Fig. 12 is a perspective view of one of the angle plates to which the sash groove closure plates are secured. Fig. 13 is a horizontal sectional view taken on the dotted line $m$—$n$ of Fig. 4. Fig. 14 is an inside elevation view of the lower end of the upper sash. Fig. 15 is a vertical sectional view taken on the dotted line $g$—$h$ of Fig. 4. Fig. 16 is a perspective view of one of the filler members. Fig. 17 is an end view of one of the screws employed to secure the adjustable stop to the frame. Fig. 18 is a view partly in vertical section and partly in side elevation of three of the parts employed to secure the adjustable stop to the window frame, a portion of the frame being shown in section, the parts being shown detached from each other. Fig. 19 is a horizontal section taken on the dotted line $o$—$p$ of Fig. 6 and showing the parts secured together which are illustrated in Fig. 18.

Similar characters of reference denote similar parts.

A denotes the metallic window frame and B and C the upper and lower sashes respectively, which are vertically slidable in the frame.

The vertical portions of the frame are provided each on its inner side 1 with a pocket opening extending vertically the full length of the paths in which the sashes B and C slide. These pocket openings are normally closed by two vertical pocket plates 2 which serve as bearing plates against which the sashes bear and which extend the full width between the vertical stops on the sides 1 of the frame. There are four of these stops, two of them denoted by 3, at one side of the frame are fixed, and the two denoted by 4, are removable and are adjustable toward and from the sashes adjacer thereto. Each pocket plate 2 is of channel form the two parallel sides of said pocket plate being mounted respectively in two vertical grooves formed by folding the vertical edges 5 of the plate 1 at opposite sides of the pocket openings of said plate. Each pocket plate 2 is secured in position by means of horizontal screws 6 extending through the pocket plate and having their screw threaded outer ends fitted in screw threaded holes provided in the horizontal channel-shaped clamping bars 7 the parallel ends of each of which embrace the outer sides respectively of the bent portions 5 of the adjacent plate 1. Each pocket or bearing plate 2 has a channel formed rib 8 centrally disposed and extending vertically the full length of the pocket plate and which serves as a parting strip separating the sashes B and C. Two vertical plates 9 are secured respectively in the grooves of the ribs 8, said grooves facing outward or in a direction opposite to the sashes. The plates 9 serve to separate the sash weights 10 and 11 which serve to counterbalance respectively the weight of the sashes B and C. Cords 12 and 13 are connected at one set of ends to the weights 10 and 11 respectively and at the other set of ends to the sashes B and C respectively. The cords 12 and 13 are mounted in the ordinary manner upon pulleys 14, mounted upon the upper end of the frame A. The stops 3 are preferably formed integrally with the vertical portion 1 at one side of the frame A and are disposed at opposite sides of the channel rib 8 of the adjacent pocket plate 2. The stops 4 are disposed at opposite sides of the channel rib 8 of the adjacent pocket plate 2 and are, by means of the following described mechanism, adjustable toward and from the adjacent rib 8 and also toward and from the sashes B and C.

Referring to Figs. 18 and 19, and also to Fig. 6, 15 denotes a plurality of screws employed to secure each stop 4 to the adjacent portion 1 of the frame A. Each stop 4 is provided with a plurality of transverse slots 16 through which the screws 15 extend, the threaded ends of said screws being fitted each in the longitudinal threaded hole 17 extending through the head and shank of a screw 18, the externally threaded shank of which extends through a hole 19 provided in the adjacent plate 1, said screw 18 being secured to the plate 1 by means of a nut 20, mounted on the shank of the screw 18 on the side of the plate 1 opposite that portion on which bears the head of the screw 18. It will be understood that there are a number of screws 18 corresponding in number to the number of screws 15. Each screw 18 is provided on the end of the head with an annular recess 21 encircling and beveled toward the threaded opening 17. The beveled recess 21 serves to guide the threaded end of the screw 15 into the threaded hole 17 when the screw 15 is inserted through the stop 4, the stop at the time covering the adjacent screws 18. To adjust the stops 4 toward and from the rib 8 the screws 15 are loosened, after which the stops 4 are moved laterally to the positions desired, following which the screws 15 are turned so as to rigidly clamp the stops 4 against the adjacent plates 1.

One or both side edges of each sash is vertically grooved and in each of said grooves is mounted a longitudinal filler 25 adapted to bear against the adjacent pocket plate 2, means preferably resilient being employed to normally force said filler 25 horizontally against the adjacent pocket plates. The said vertical grooves in the sashes are closed each at one end and are preferably each open at the other end whereby the fillers 25 may be inserted in or removed from said grooves respectively through the open ends thereof while the sashes are in position in the frame and without removing the stops 4. Suitable closures are provided for the open ends of said vertical grooves, as hereinafter described.

I will now describe the construction of sash and filler preferably employed:— The sash stiles and rails are denoted respectively by numerals 26 and 27. Each stile is formed of sheet metal and is composed of a channel shaped member 26 the vertical edges of which are disposed adjacent the adjacent pocket plate 2. Between the parallel sides of the member 26 is mounted vertically a channel shaped binder plate 28, the channel side of which is disposed next the adjacent pocket plate 2. As shown in Fig. 9 the parallel vertical edges of the binder plate 28 are folded around the vertical edges of the channel member 26, through which the binder plate is rigidly secured. It will thus be seen that each stile of each sash is provided with a longitudinal groove the lower end of which is closed by the lower stile 27, as shown in Figs. 3 and 4. The upper end of each groove is open to permit the insertion and removal therethrough of the filler 25. Each filler 25 preferably comprises a member bent in channel form, the ends being turned toward the sash and away from the adjacent pocket plate 2, the channel side of the filler being disposed next the adjacent binder plate 28. Secured in the channel side of each filler 25 are four spring strips 29 one end of each of which is secured to the filler. The strips 29 bear against the adjacent binder plate 28 and normally force the filler 25 horizontally toward and against the adjacent pocket plate 2. By this construction the sashes may be made to fit loose in the frame the fillers 25 serving to close the spaces intermediate the sashes and the frame. On the inner side and upper end of each binder plate 28 is secured the vertical portion of a right angled bracket 30, the lower end of which is provided with a notch 31 which registers with a slot 32 provided in the adjacent binder plate 28. The notches 31 and slots 32 are provided to receive the ends of the sash cords 12 and 13 respectively, said ends being provided each with an enlargement 33, which prevents detachment of the cord from the sash. The rails 27 are constructed similarly to the stiles with the exception that each rail is provided with a horizontal binder plate 27′ of channel form, the side edges being turned at right angles and having the adjacent horizontal edges of the channel member 27 folded at 34 around the right angled edges of said binder plates, as shown in Fig. 15. The upper binder plates 27′ on the upper rails extend between but do not cover the grooves in the side edges of the sashes. Secured upon each binder plate 27′ are two removable closures comprising two horizontal plates 35 which cover the grooves in the side edges of the sash and normally prevent upward lengthwise movement of the fillers 25. Each closure 35 is provided with a vertical hole 36 through which extends a vertical screw 37 the threaded lower end of which is fitted in a vertical screw threaded hole in the horizontal portion of the adjacent bracket 30. Each closure 35 is provided with a notch 38 in its outer edge through which extends the adjacent sash cord. When for any reason it is desired to remove a filler, the adjacent plate 35 is removed by removing the securing screw 37, the filler may then be withdrawn upwardly from its groove without removing the sash or any of the stops. If the one removed is unduly worn a new filler may be inserted through the end of the groove in the side edge of the sash, after which the plate 35 is secured in position by its screw 37.

When the sashes are of considerable width, two panes of glass 40 disposed edge to edge may be employed in each sash. In the drawings I have illustrated the lower sash C provided with two panes 40. To secure the panes in position, where two panes are used in a sash, the sash C is provided in the inner side of each stile with a vertical groove 39 to receive the outer vertical edge of the adjacent pane 40. The lower side of the upper rail of the sash is provided with a horizontal groove 39′ to receive the upper edges of the two panes. The upper side of the lower rail of the sash is provided with a right angled horizontal groove to receive the lower edges of the panes. Intermediate the stiles are disposed two vertical members 41 and 42 between which the inner side edges of the panes are secured. The ends of the member 42 are rigidly secured to the upper and lower rails. The member 41 is provided with two horizontal holes through which extend screws 43 the ends of which are fitted in threaded holes provided in the member 42. To insert the panes 40, the member 41 is removed, the panes are then inserted in the groove 39′ and then slid laterally into the grooves 39 in the stiles. The member 41 is then mounted in position against the panes and the screws 43 secured in position between the two panes of glass, the members 41 and 42 covering the inner edges of the panes.

To remove a sash from the frame, the stop 4 securing it is removed by removing the securing screws that hold the stop to the frame, after which the sash may be swung outward, as shown in Fig. 2.

My invention may be modified in different ways within the scope of the appended claims without departing from its spirit.

Having thus described my invention, what I claim and desire to secure by Letters Patent, is:—

1. A sash having in one vertical edge a vertical groove open at one end, a longitudinal filler insertible in said groove through the open end thereof, and releasable means for closing said open end.

2. A sash having at one vertical edge a vertical groove open at one end, a longitudinal filler movable inward and outward horizontally in said groove and insertible and removable through the open end of the groove, releasable means for closing said open end of the groove, and means for normally forcing said filler normally horizontally outward.

3. A sash having at one vertical edge a vertical groove open at one end, a longitudinal filler movable horizontally inward and outward in the groove and insertible and removable through the open end of the groove, resilient means for normally forcing said filler horizontally outward, and releasable means for normally closing the open end of said groove.

4. A sash having at one vertical edge a vertical groove open at one end, a longitudinal filler movable horizontally inward and outward in said groove and insertible and removable through said open end of the groove, a plate for closing said open end, and releasable means for securing the plate to the sash.

5. A sash having at one vertical edge a vertical groove open at one end, a longitudinal filler horizontally movable inward and outward in said groove and insertible and removable through said open end, resilient means for normally forcing said filler horizontally outward, a plate for closing said open end of the groove, and means for securing the plate to the sash.

6. In a sheet metal sash, a tubular stile having in its outside edge a vertical groove, the groove having one open and one closed end, a removable closure for the open end, and a filler horizontally movable in said groove and insertible and removable through the open end of the groove when the closure is removed.

7. In a sheet metal sash, a tubular stile having in its outside edge a vertical groove, the groove having one open and one closed end, a removable closure for the open end, a filler horizontally movable in said groove and insertible and removable through the open end of the groove when the closure is removed, and means for normally forcing said filler horizontally outward.

8. In a sheet metal sash, a tubular stile having in its outside edge a vertical groove having one closed and one open end, a removable closure for the open end of the groove, a filler insertible and removable through said open end, and resilient means for normally forcing the filler horizontally outward in said groove.

9. A sheet metal sash having tubular stiles each having in its outer edge a vertical groove having one open and one closed end, removable closures for said open ends of said grooves, two fillers insertible and removable respectively through the open ends of said grooves when the closures are removed, and resilient means for normally forcing said fillers outward horizontally in said grooves.

10. In a sheet metal sash, the tubular sheet metal rails secured to the stiles, one of the stiles having in the side which forms the side edge of the sash a vertical groove, a vertical binder plate in said groove and connected to the stile at opposite sides of said groove a filler mounted longitudinally in said groove, and means for normally forcing said filler horizontally outward.

11. In a sheet metal sash, the tubular sheet metal rails secured to the stiles, one of the stiles having in the side which forms the side edge of the sash a vertical groove having one open and one closed end, a removable closure for the open end of the groove, a filler mounted lengthwise in said groove, and means for normally forcing the filler horizontally outward, the filler being insertible and removable through the open end of the groove when the closure is removed.

12. In a sheet metal sash, a sash stile comprising a channel formed vertical member, and a vertical binder plate of channel form secured immovably to and between the sides of the channel formed member, the grooved side of the binder plate forming the outer vertical edge of the sash, the two parallel sides of the binder plate being folded over the vertical edges of the adjacent sides of the channel member.

13. In a sheet metal sash, sash stiles and rails each comprising a channel formed member and a vertical binder plate secured immovably to and between the sides of the channel formed member and forming one edge of the sash, the binder plate having a chanel form and having its parallel sides secured to the adjacent sides of the channel member, the ends of the stiles being secured to the ends of the rails respectively.

14. A sheet metal sash comprising tubular stiles and rails; the inner sides of the stiles having each a vertical groove to receive the glass, and two vertical members between which the glass is secured intermediate the stiles, one of said members being secured at its ends to the rails, the other member having means for being releasably secured to the member secured to the rails.

15. In a sheet metal sash, the stiles formed of sheet metal and having each in the side forming the side edge of the sash a vertical groove, the rails secured to opposite ends of the stiles, one rail closing one end of each of said grooves, the other end of each groove being open, and removable closures mounted on the other rail and closing said grooves respectively at the open ends.

16. The combination with the frame, of the sash vertically slidable in the frame and having at one side edge a vertical groove, a filler disposed lengthwise in the groove and insertible and removable through one end of the groove while the sash is in operative position in the frame, and means for normally forcing the filler toward the frame.

17. The combination with the frame, of a sash vertically slidable in the frame and having at one side edge a vertical groove, a filler disposed lengthwise in said groove, and insertible in and removable from said groove and detachable from the sash and frame while the sash is in operative position in the frame, and means for normally forcing the filler laterally toward the frame.

18. A window frame having front and rear vertical stops between which the sashes slide and provided with a pocket opening extending the full width between the stops and the full length of travel of the sashes, and a pocket plate releasably secured to said frame and closing said opening.

19. A window frame having front and rear vertical stops between which the sashes slide and provided with a pocket opening extending the full width between the stops and the full length of travel of the sashes, a pocket plate for closing said opening, and means for releasably securing the pocket plate to the frame.

20. A window frame having front and rear vertical stops between which the sashes slide and provided with a pocket opening extending the full length of travel of the sashes and the full width between the stops, and a pocket plate secured to the frame and closing said opening, and provided with a vertical rib forming a parting strip to separate the sashes.

21. A window frame having front and rear vertical stops between which the sashes slide and provided with a pocket opening extending the full length of travel of the sashes and the full width between the stops, a pocket plate releasably secured to the frame and closing said opening and having a vertical channel formed rib on the side adjacent the sashes and serving as a parting strip to separate the sashes, and a vertical plate mounted in the channel of the rib on the side of the pocket plate distant from the sashes and serving to separate the sash weights.

22. A window frame having front and rear vertical stops between which the sashes slide and provided on each side with a pocket opening extending the full length of travel of the sashes and the full width between the stops, two pocket plates releasably secured to the frame and closing said openings and provided each with a vertical channel formed rib, two sashes vertically slidable between said stops and at opposite sides of said rib, two vertical plates secured respectively in the channels of said pocket ribs, and four sash weights secured two to each sash and disposed upon opposite sides of the adjacent ones of the last named vertical plates.

23. A window frame having front and rear vertical stops between which the sashes slide and provided at each side of the frame with a pocket opening extending the full length of travel of the sashes and the full width between the stops, two pocket plates releasably secured to the frame and closing respectively said openings and provided each with a vertical rib, forming a parting strip, and two sashes vertically slidable between the stops and at opposite sides of said rib.

24. A window frame having at each side next the sashes front and rear vertical stops, and provided at each side between the stops and the full length of travel of the sashes with a pocket opening, the sides of the frame at each side of each of said openings having a vertical groove facing the sashes, and two pocket plates releasably secured to the frame and closing respectively said openings each pocket plate having its vertical edges turned in a direction away from the sashes and fitted in the adjacent grooves of the frame.

25. A window frame having front and rear vertical stops at each side of the frame, and having at each side of the frame a pocket opening extending the full travel of the sashes and the full width between the stops, the sides of the frame at opposite edges of each of said openings having vertical grooves, the grooves being on the side of the frame adjacent the sashes, and two pocket plates releasably secured to the opposite sides of the frame and closing respectively said openings and provided each with a vertical rib which serves as a parting strip for the sashes the vertical edges of each pocket plate being turned away from the sashes and fitted in the adjacent grooves of the sides of the frame.

26. A window frame having front and rear stops at each side of the frame, and having at opposite sides of the frame two pocket openings which extend the full length of travel of the sashes and the full width between the adjacent stops, the sides of the frame at both sides of each pocket opening having vertical grooves, two vertical pocket plates releasably secured to opposite sides of the frame and closing said pocket openings and provided each at its vertical edges with flanges fitted in said grooves of the frame, each pocket plate having a vertical channel formed rib which serves as a parting strip for the sashes, and two plates secured respectively in said channels of opposite ribs respectively, the last named plates serving to separate the sash weights adjacent thereto and disposed at the sides of the frame distant from the sashes.

27. In a window frame, two bearing plates secured releasably to the vertical sides of the frame and extending the full length and width of the path of travel of the sashes, and serving as edge bearings for the sashes.

28. In a window frame, two bearing plates secured releasably to the vertical sides of the frame adjacent the sashes and extending the full length and width of the path of travel of the sashes and serving as bearings for the sashes, each plate having a vertical rib serving as a parting strip to separate the sashes.

29. The combination with the window frame, of a laterally adjustable vertical stop having a plurality of transverse slots, screws mounted in said slots respectively, and a plurality of members secured to the adjacent vertical side of the frame and provided with threaded openings to receive respectively said screws, the said members at the side adjacent the stop being each counter sunk around the threaded opening therethrough, so as to guide into said threaded opening the adjacent screw.

30. A device for receiving the threaded end of a screw comprising a body having a head and a screw threaded shank and provided with a threaded hole extending longitudinally through the head and shank, the head around said threaded hole having an annular recess beveled to said hole.

31. In a metal window, the combination with the frame, of the sash vertically slidable therein, one side edge of the sash having a vertical groove, a channel formed filler disposed lengthwise in said groove and adapted to bear against the adjacent side of the frame, the ends of the filler being turned toward the sash, the sash having means for holding the filler against lengthwise movement, and resilient means for normally forcing the filler against the frame.

32. In a metal window, the combination with the frame, of the sash vertically slidable therein, one side edge of the sash having a vertical groove having an open and a closed end, a longitudinal filler insertible in and removable from the groove through the open end and adapted to bear against the frame, the ends of the filler being turned toward the sash, a removable closure on the sash for the open end of the groove, and resilient means for normally forcing the filler against the frame.

33. In a metal window, the combination with the frame having side bearing plates removably secured to the body of the frame and provided each with a vertical rib which serves as a parting strip to separate the sashes, vertical stops secured to the window frame at opposite vertical sides of the frame next the sashes and at opposite sides of said ribs, the sashes slidable at opposite sides of said ribs and between the stops, two fillers carried one on each sash and disposed vertically intermediate the sashes and the adjacent bearing plates respectively, and means for normally forcing the fillers laterally toward the adjacent bearing plates.

34. The combination with the frame, of the sash vertically slidable in the frame, and a longitudinal filler intermediate the sash and frame and vertically movable with the sash, and detachable from the sash and frame without removing the sash from operative position in the frame, the filler being movable toward and from the sides of the frame.

35. The combination with the frame, of the sash vertically slidable in the frame and having at one side edge a vertical groove, and a longitudinal filler in said groove and movable laterally relative to the sides of the frame, the filler being insertible in and removable from said groove and detachable from the sash and frame while the sash is in operative position in the frame.

In testimony whereof I affix my signature in presence of two witnesses.

WILLIAM E. ZAHNER.

Witnesses:
E. B. HOUSE,
LESTER RAY.